US012656928B2

(12) United States Patent
Fang et al.

(10) Patent No.: US 12,656,928 B2
(45) Date of Patent: Jun. 16, 2026

(54) INTERACTION METHOD FOR GESTURE-BASED CONTROL IN THREE-DIMENSIONAL ENVIRONMENT

(71) Applicant: Beijing Zitiao Network Technology Co., Ltd., Beijing (CN)

(72) Inventors: Chi Fang, Beijing (CN); Mengqian Liu, Beijing (CN); Rongxuan Mu, Beijing (CN); Jia Guo, Beijing (CN); Shuo Liu, Beijing (CN); Chin-Wei Liu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/971,705

(22) Filed: Dec. 6, 2024

(65) Prior Publication Data

US 2025/0190087 A1 Jun. 12, 2025

(30) Foreign Application Priority Data

Dec. 6, 2023 (CN) .......................... 202311668520.5

(51) Int. Cl.
*G06F 3/04812* (2022.01)
*G06F 3/01* (2006.01)
*G06F 3/04815* (2022.01)

(52) U.S. Cl.
CPC .......... *G06F 3/04812* (2013.01); *G06F 3/017* (2013.01); *G06F 3/04815* (2013.01)

(58) Field of Classification Search
CPC ... G06F 3/04812; G06F 3/017; G06F 3/04815
See application file for complete search history.

(56) References Cited

U.S. PATENT DOCUMENTS

| | | | | |
|---|---|---|---|---|
| 11,257,280 | B1 * | 2/2022 | Pedrotti | .............. G06F 3/04812 |
| 11,422,669 | B1 * | 8/2022 | Ravasz | ................... G06F 3/013 |
| 12,118,200 | B1 * | 10/2024 | Shutzberg | ............. G06F 3/0482 |
| 2016/0188181 | A1 * | 6/2016 | Smith | ................. G06F 3/04886 |
| | | | | 715/765 |
| 2020/0387287 | A1 | 12/2020 | Ravasz et al. | |
| 2021/0090331 | A1 | 3/2021 | Ravasz et al. | |

(Continued)

FOREIGN PATENT DOCUMENTS

CN 116540866 A 8/2023

OTHER PUBLICATIONS

European Patent Office, Extended European Search Report Issued in Application No. 24217162.7, Apr. 2, 2025, Germany, 10 pages.

(Continued)

*Primary Examiner* — Afroza Chowdhury
(74) *Attorney, Agent, or Firm* — Alleman Hall LLP

(57) ABSTRACT

The present application discloses an interaction method and apparatus, a storage medium, a device, and a program product. The method includes: displaying a three-dimensional environment generated by a virtual reality device; presenting a user interaction interface in the three-dimensional environment; recognizing a gesture of a current object; displaying, based on the user interaction interface and a position of the gesture, a visual indication which points to the user interaction interface from the gesture; and completing a related interaction operation in the user interaction interface based on the gesture and the visual indication.

20 Claims, 7 Drawing Sheets

(56) References Cited

U.S. PATENT DOCUMENTS

| | | | |
|---|---|---|---|
| 2021/0263593 A1* | 8/2021 | Lacey ................. | G02B 27/017 |
| 2022/0130100 A1 | 4/2022 | Pedrotti et al. | |
| 2024/0135660 A1* | 4/2024 | Nakamura ............... | G06T 3/40 |

OTHER PUBLICATIONS

Jota, R. et al., "A Comparison of Ray Pointing Techniques for Very Large Displays," Proceedings of Graphics Interface Conference, May 31, 2010, Ottawa, Canada, 8 pages.

* cited by examiner

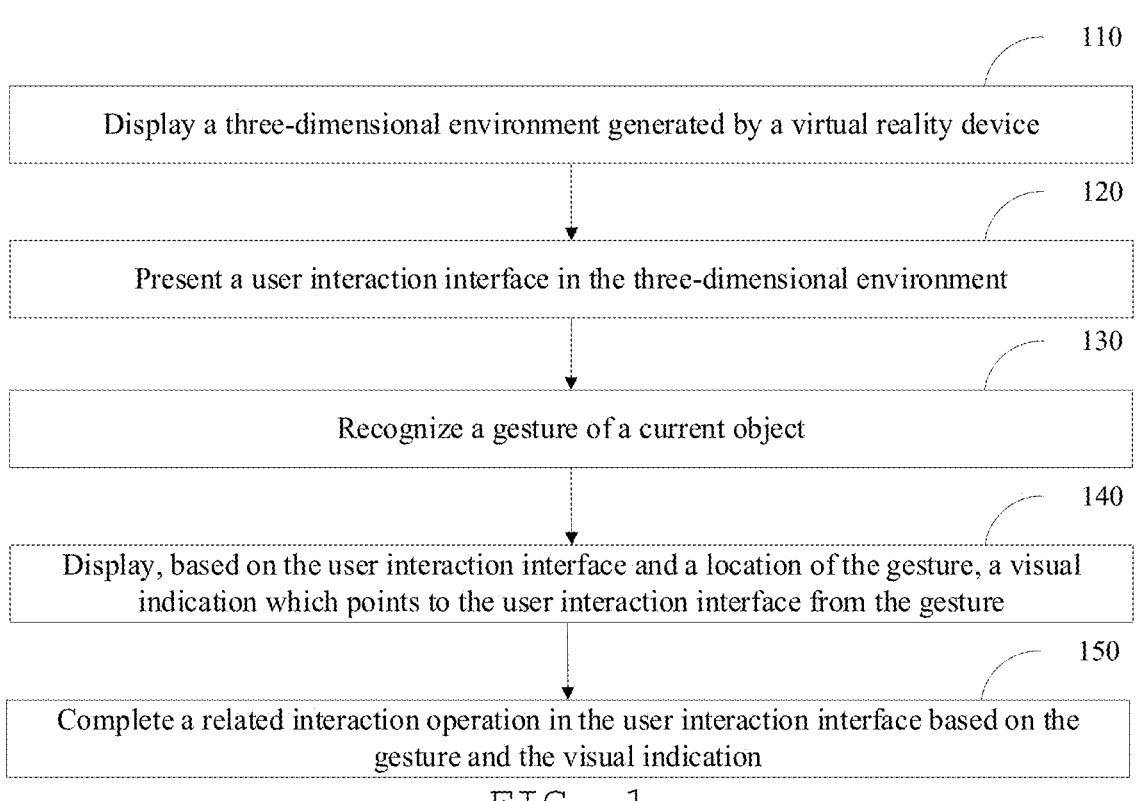

110

Display a three-dimensional environment generated by a virtual reality device

120

Present a user interaction interface in the three-dimensional environment

130

Recognize a gesture of a current object

140

Display, based on the user interaction interface and a location of the gesture, a visual indication which points to the user interaction interface from the gesture

150

Complete a related interaction operation in the user interaction interface based on the gesture and the visual indication

FIG. 1

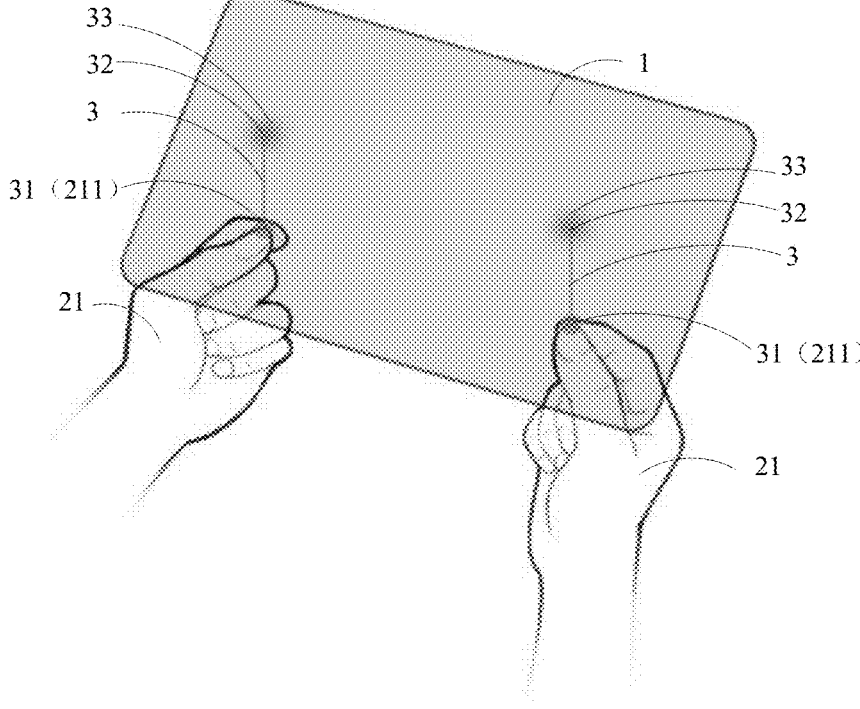

FIG. 2

Ray start point

INTERACTION METHOD FOR GESTURE-BASED CONTROL IN THREE-DIMENSIONAL ENVIRONMENT

CROSS-REFERENCE TO RELATED APPLICATIONS

The present disclosure is based on and claims priority to China Patent Application No. 202311668520.5 filed on Dec. 6, 2023 and entitled as "Interaction method and apparatus, storage medium, device, and program product", the disclosure of which is incorporated by reference herein in its entirety.

TECHNICAL FIELD

The present application relates to the field of extended reality (XR) technologies, and in particular, to an interaction method and apparatus, a storage medium, a device, and a program product.

BACKGROUND

With the popularization of extended reality technologies, interaction becomes one of the core problems that need to be solved urgently during the development of the extended reality technologies. The interaction with a virtual scene is generally implemented through an interaction device such as an external joystick. Such an interaction mode is dull, resulting in a poor immersive experience of users.

SUMMARY

According to an aspect, an embodiment of the present application provides an interaction method. The method includes:

displaying a three-dimensional environment generated by a virtual reality device; presenting a user interaction interface in the three-dimensional environment; recognizing a gesture of a current object; displaying, based on the user interaction interface and a position of the gesture, a visual indication which points to the user interaction interface from the gesture; and completing a related interaction operation in the user interaction interface based on the gesture and the visual indication.

According to another aspect, an embodiment of the present application provides an interaction apparatus. The apparatus includes:

a first display unit configured to display a three-dimensional environment generated by a virtual reality device;

a presentation unit configured to present a user interaction interface in the three-dimensional environment;

a recognition unit configured to recognize a gesture of a current object;

a second display unit configured to display, based on the user interaction interface and a position of the gesture, a visual indication which points to the user interaction interface from the gesture; and an interaction unit configured to complete a related interaction operation in the user interaction interface based on the gesture and the visual indication.

According to another aspect, an embodiment of the present application provides a non-transitory computer-readable storage medium storing a computer program, where the computer program is adapted to be loaded by a processor, to perform the interaction method according to any one of the above embodiments.

According to another aspect, an embodiment of the present application provides a terminal device including a processor and a memory, where the memory stores a computer program, and the processor is configured to perform the interaction method according to any one of the above embodiments by invoking the computer program stored in the memory.

According to another aspect, an embodiment of the present application provides a computer program product including a computer program that, when executed by a processor, causes the interaction method according to any one of the above embodiments to be implemented.

BRIEF DESCRIPTION OF THE DRAWINGS

To describe the technical solutions in the embodiments of the present application more clearly, the following briefly describes the accompanying drawings required for describing the embodiments. Apparently, the accompanying drawings in the following description show merely some embodiments of the present application, and those skilled in the art may derive other drawings from these accompanying drawings without creative efforts.

FIG. 1 is a schematic flowchart of an interaction method according to an embodiment of the present application.

FIG. 2 is a schematic diagram of a first application scenario of the interaction method according to an embodiment of the present application.

DETAILED DESCRIPTION

Figure 3:
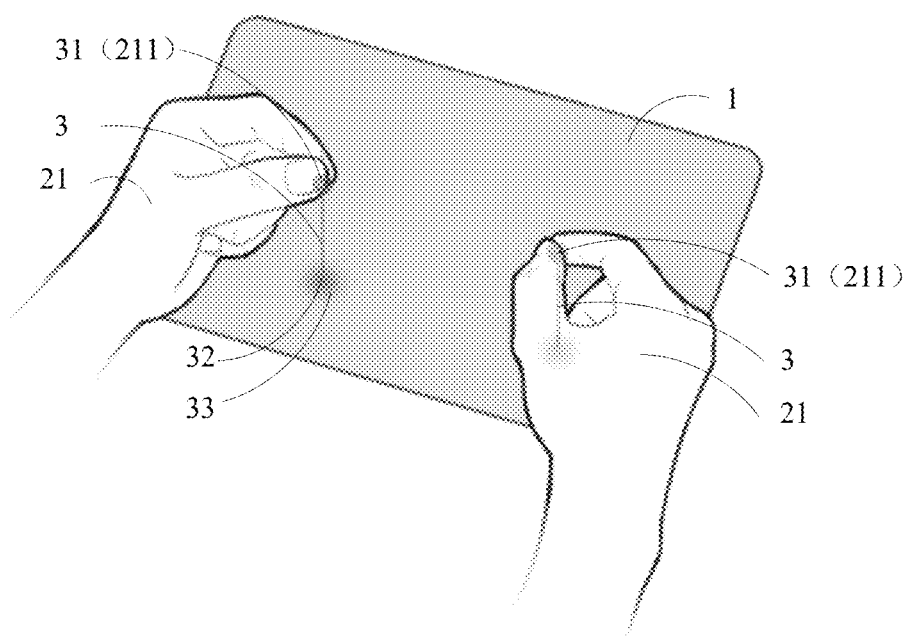
FIG. 3 is a schematic diagram of a second application scenario of the interaction method according to an embodiment of the present application.

The technical solutions in the embodiments of the present application will be described clearly and completely below with reference to the accompanying drawings in the embodiments of the present application. Apparently, the described embodiments are only some rather than all of the embodiments of the present application. All other embodiments obtained by those skilled in the art based on the embodiments of the present application without creative efforts shall fall within the scope of protection of the present application.

In the embodiments of the present application, the three-dimensional environment generated by the virtual reality device is displayed; the user interaction interface is presented in the three-dimensional environment; the gesture of the current object is recognized; the visual indication which points to the user interaction interface from the gesture is displayed based on the user interaction interface and the position of the gesture; and the related interaction operation is completed in the user interaction interface based on the gesture and the visual indication. According to the embodiments of the present application, the visual indication may be generated through the gesture, to provide clear visual feedback, and the related interaction operation may be completed in the user interaction interface based on the gesture and the visual indication, making interaction in the three-dimensional environment more diverse and interesting, thereby improving the immersive experience of users.

The embodiments of the present application may be applied to various application scenarios, such as extended reality (XR), virtual reality (VR), augmented reality (AR), and mixed reality (MR).

First, some nouns or terms that appear in the description of the embodiments are explained as follows.

Virtual scene is a virtual scene that is displayed (or provided) when an application is running on a terminal or server. Optionally, the virtual scene is a simulated environment of a real world, a semi-simulated and semi-fictional virtual environment, or a purely fictional virtual environment. The virtual scene is either a two-dimensional virtual scene or a three-dimensional virtual scene. The virtual environment may be the sky, the land, the sea, etc., where the land includes environmental elements such as deserts and cities. The virtual scene is a scene for complete game logic of a virtual object controlled by a user, etc.

Virtual object is a dynamic object that can be controlled in the virtual scene. Optionally, the dynamic object may be a virtual character, a virtual animal, an anime character, etc. The virtual object is a character controlled by a player using an input device, or artificial intelligence (AI) set up in a virtual environment-based battle through training, or a non-player character (NPC) set up in a virtual scene-based battle. Optionally, the virtual object is a virtual character that engages in a competition in the virtual scene. Optionally, the number of virtual objects in the virtual scene-based battle is preset, or is dynamically determined based on the number of clients joining the battle, which is not limited in the embodiments of the present application. In a possible implementation, the user can control the virtual object to move, for example, to run, jump, crawl, etc., in the virtual scene, and can also control the virtual object to use skills, virtual props, etc. provided by the application to battle with other virtual objects. Optionally, the virtual object may alternatively be a static object that can be interacted with in the virtual scene, for example, a virtual entity, a virtual control, an interface element, a virtual prop, etc.

Extended reality (XR) is a concept including virtual reality (VR), augmented reality (AR), and mixed reality (MR), representing a technology that allows for the creation of an environment where a virtual world is connected to a physical world, enabling a user to interact with the environment in real time.

Virtual reality (VR) is a technology that allows for the creation and experience of a virtual world. It generates a virtual environment through computation, is multi-source information (the virtual reality mentioned herein includes at least visual perception, may further include auditory perception, tactile perception, and motion perception, and even includes gustatory perception, olfactory perception, etc.), and achieves an interactive simulation of a three-dimensional dynamic visual scene and an entity behavior which is integrated with the virtual environment, immersing a user in a simulated three-dimensional environment, and realizing applications in a plurality of virtual environments such as in maps, games, videos, education, medical care, simulation, collaborative training, sales, assisted manufacturing, maintenance, and repair.

Augmented reality (AR) is a technology for computing, in real time in a process in which a camera acquires an image, a camera posture parameter of the camera in a physical world (or referred to as a three-dimensional world or a real world) and adding, based on the camera posture parameter, a virtual element to the image acquired by the camera. The virtual element includes, but is not limited to: an image, a video, and a three-dimensional model. An objective of the AR technology is to connect the virtual world to the physical world for interaction.

Mixed reality (MR) integrates a sensory input (for example, a virtual object) created by a computer and a sensory input from a physical setting or a representation thereof in a simulated setting. In some MR settings, the sensory input created by the computer may adapt to changes in the sensory input from the physical setting. In addition, some electronic systems configured to present the MR setting may monitor an orientation and/or a position relative to the physical setting, so that the virtual object can interact with a real object (that is, a physical element from the physical setting or a representation thereof). For example, the system may monitor motion, so that a virtual plant looks still relative to a physical building.

Augmented virtuality (AV): An AV setting is a simulated setting in which a computer-created setting or a virtual setting is incorporated with at least one sensory input from a physical setting. One or more sensory inputs from the physical setting may be a representation of at least one feature of the physical setting. For example, a virtual object may present the color of a physical element captured by one or more imaging sensors. For another example, a virtual object may present features that are consistent with actual weather conditions in the physical setting, for example, features recognized through a weather-related imaging sensor and/or online weather data. In another example, an augmented reality forest may have virtual trees and structures, but an animal may have features that are accurately reproduced from images taken of a physical animal.

Virtual field of view is a region in a virtual environment that a user can perceive through the lens of a virtual reality device, and the perceived region is represented by an angle of the virtual field of view (FOV).

A virtual reality device is a terminal that achieves virtual reality effects, and may be generally provided in the form of glasses, a head-mounted display (HMD), or contact lenses, to implement visual perception and other forms of perception. Certainly, the virtual reality device is not limited to these implementation forms, and may be further miniaturized or enlarged as needed.

The virtual reality device described in the embodiments of the present application may include, but is not limited to, the following types:

a personal computer virtual reality (PCVR) device which performs computation related to a virtual reality function and data output by using a PC, where an external personal computer virtual reality device achieves virtual reality effects by using data output by the PC;

a mobile virtual reality device which supports setting of a mobile terminal (for example, a smartphone) in various manners (for example, a head-mounted display provided with a special slot), and is connected to the mobile terminal in a wired or wireless manner, where the mobile terminal performs computation related to a virtual reality function, and outputs data to the mobile virtual reality device, for example, a virtual reality video is watched through an app on the mobile terminal; and an integrated virtual reality device which has a processor configured to perform computation related to a virtual function, and therefore has an independent virtual reality input and output function, with no need to be connected to a PC or a mobile terminal, providing a high degree of freedom of use.

They are respectively described in detail below. It should be noted that the order of description of the following embodiments does not constitute a limitation on the order of precedence for the embodiments.

Each embodiment of the present application provides an interaction method. The method may be performed by a terminal or a server, or by both the terminal and the server. In the embodiment of the present application, description is made by using an example in which the interaction method is performed by a terminal device.

Referring to FIG. 1 to FIG. 11, FIG. 1 is a schematic flowchart of an interaction method according to an embodiment of the present application, and FIG. 2 to FIG. 11 are all schematic diagrams of application scenarios of the interaction method according to an embodiment of the present application. The method may be applied to a terminal device. The terminal device may include any one of an extended reality device, a virtual reality device, an augmented reality device, and a mixed reality device. The method includes the following steps 110 to 150.

Step 110: Display a three-dimensional environment generated by a virtual reality device.

The three-dimensional environment generated by the virtual reality device includes not only a real spatial environment, but also a virtual spatial environment. The three-dimensional environment may be a virtual reality environment. This three-dimensional environment may be generated by a computer, or may be obtained through acquisition and processing by other devices. In the virtual spatial environment, a user can see how the user and other objects behave in a virtual space, having a feeling of immersion.

Step 120: Display a user interaction interface in the three-dimensional environment.

For example, a point cloud map of the three-dimensional environment may be constructed based on real environment image data acquired and processed by a tracking camera and an inertial measurement unit, and the user interaction interface may be displayed at a set coordinate position based on coordinates of the point cloud map in the three-dimensional environment.

The user interaction interface is displayed in the three-dimensional environment. This usually involves the use of specific virtual reality technologies, for example, devices such as a head-mounted display and a joystick, to create and display the three-dimensional environment. In this three-dimensional environment, the user may see a virtual image generated by a computer, and obtain a visual feedback through a device such as the head-mounted display. When the user interaction interface is displayed, it is necessary to ensure that the user interaction interface can be clearly and accurately presented to the user in the three-dimensional environment. An interface position, interface content, a layout, a color, etc. of the user interaction interface may be preset to provide a user-friendly interaction experience. In addition, it is necessary to ensure that the interaction between the user interaction interface and other virtual objects (such as virtual entities or characters) in the three-dimensional environment can be performed normally, so that the user can interact with a virtual environment through various operations.

For example, when the user interaction interface is displayed in the three-dimensional environment, an interface position of the user interaction interface in the three-dimensional environment may be obtained. When the user interaction interface is generated and displayed in the three-dimensional environment, the interface position of the user interaction interface may be set based on a user-friendly interaction distance, where the user-friendly interaction distance may be determined through a large number of experiments. The interface position of the user interaction interface may also be adjusted in real time based on hand movement and head position information of the user.

Step 130: Recognize a gesture of a current object.

In the three-dimensional environment (for example, the virtual reality environment), the user interaction interface is presented to provide an interaction interface between the user and the virtual reality environment. The interface may include various elements such as buttons, icons, and text boxes, and all of the elements may be operated by the user through gestures.

When the user makes a gesture, such as finger pinching, swiping, or clicking, in the three-dimensional environment, the gesture is captured by the virtual reality device and converted into an electrical signal. The electrical signal is then transmitted to a processor for processing. An algorithm in the processor analyzes the electrical signal to recognize the type and position of the gesture.

In some embodiments, the recognizing a gesture of a current object includes: recognizing a finger pinch gesture of the current object, and obtaining pinch point position coordinates of a pinch point of the finger pinch gesture in the three-dimensional environment.

For example, the current object may be a user currently using the virtual reality device.

For example, the gesture of the current object may be recognized and tracked based on one or more image sensors of the virtual reality device, to recognize the finger pinch gesture of the current object and obtain the pinch point position coordinates of the pinch point of the finger pinch gesture in the three-dimensional environment.

The image sensor may be one or more cameras or camera lenses used to capture hand image information of the current object. These cameras or camera lenses may be provided on the head-mounted display or other virtual reality devices, to obtain the hand image information of the current object. The finger pinch gesture may be recognized by analyzing and processing the hand image information. For example, pre-processing, such as denoising and color space conversion, may be performed on a hand image, to improve the quality and clarity of the image. Then, an image processing algorithm, such as feature extraction and template matching, may be used to recognize the shape and position information of a hand. When the finger pinch gesture is recognized, information, such as a distance between fingers in the hand image and positions of the fingers may be computed and analyzed, to determine the pinch point position coordinates.

In some embodiments, the finger pinch gesture includes one of a one-handed pinch gesture and a two-handed pinch gesture.

For example, the one-handed pinch gesture may be a gesture formed by bringing together at least two fingers of either hand. For example, the thumb of either hand and any other finger (such as the index finger or middle finger) of the same hand may be brought together to form a corresponding one-handed pinch gesture. A contact point where the thumb and any other finger of the same hand are brought together may be a pinch point of the one-handed pinch gesture.

For example, the two-handed pinch gesture may be a gesture formed by bringing together at least two fingers of each of the two hands. For example, the thumb of each of the two hands and any other finger (such as the index finger or middle finger) of the same hand may be brought together to form a corresponding two-handed pinch gesture. A contact point where the thumb of each of two hands and any other finger of the same hand are brought together may be a pinch point of the two-handed pinch gesture.

Step 140: Display, based on the user interaction interface and a position of the gesture, a visual indication which points to the user interaction interface from the gesture.

Once the gesture is recognized, a processing unit generates a visual indication based on the user interaction interface and the position of the gesture. The visual indication may be a virtual ray, a virtual cursor, and highlighting a button, an icon, or a text box, etc., or may be displaying a new element, such as a pop-up window or a menu, in the interface. Users may confirm, through the visual indication, whether their gestures are correctly recognized, and continue to perform other interaction operations. These operations may be clicking on a button, selecting an icon, inputting text, drawing, and other operations.

In some embodiments, the visual indication includes the virtual ray and the virtual cursor.

The displaying, based on the user interaction interface and a position of the gesture, a visual indication which points to the user interaction interface from the gesture includes:

obtaining an interface position of the user interaction interface in the three-dimensional environment; and generating the virtual ray in the three-dimensional environment based on the interface position, the pinch point position coordinates, and the finger pinch gesture, and generating the virtual cursor at an intersection position of the virtual ray and the user interaction interface, where the virtual ray has a ray direction from the pinch point position coordinates toward the interface position.

For example, in the three-dimensional environment (the virtual reality environment), the position of the user interaction interface is relative to a viewing angle and position of the user. In order to obtain the interface position of the user interaction interface in the three-dimensional environment, the viewing angle and position of the user and a relative position of the user interaction interface need to be considered. First, information about the viewing angle and position of the user needs to be obtained. This may be implemented by using head tracking and position tracking technologies in the virtual reality device. The virtual reality device usually tracks the position and orientation of the head of the user, as well as the position and movement trajectory of the user. By obtaining the information, the viewing angle and position of the user in the virtual environment may be determined. Then, information about the relative position of the user interaction interface needs to be obtained. This may be implemented by locating and measuring the elements in the user interaction interface. For example, a coordinate system may be used to locate the elements in the user interaction interface, and measure positions and sizes of the elements. By obtaining the information, the relative position of the user interaction interface in the virtual environment may be determined. Then, the information about the viewing angle and position of the user may be combined with the information about the relative position of the user interaction interface, to determine the interface position of the user interaction interface in the three-dimensional environment. This may be implemented by computing a relative relationship between the viewing angle and position of the user and the elements in the user interaction interface. For example, information, such as distances, angles, and orientations between the viewing angle and position of the user and the elements in the user interaction interface, may be computed, to determine the interface position of the user interaction interface in the three-dimensional environment. It should be noted that in order to obtain the interface position of the user interaction interface in the three-dimensional environment, factors such as the size of the virtual environment and a scale need to be considered. If the size of the virtual environment is very large or the scale is very small, the interface position of the user interaction interface may be extremely precise, and more details and factors need to be considered. If the size of the virtual environment is very small or the scale is very large, the interface position of the user interaction interface may be rougher, and fewer details and factors need to be considered.

For example, the pinch point position coordinates may be obtained based on the finger pinch gesture, where the position coordinates may be used as a start point of the virtual ray. Then, the direction of the virtual ray may be determined based on a relationship between the interface position and the pinch point position coordinates. The direction may be towards the interface position, or may be determined according to specific application requirements.

Then, the virtual ray is generated in the three-dimensional environment, which may be achieved by using a generation engine of the virtual reality device. In this process, generation technologies such as rasterization and ray tracing may be used to generate a realistic virtual ray effect. In order to increase the generation efficiency and realism, a graphics processing unit (GPU) may also be used for accelerated generation.

In addition, an interaction object in the user interaction interface is confirmed to be selected in response to the finger pinch gesture, and the virtual cursor is generated at the intersection position of the virtual ray and the user interaction interface, or around or adjacent to the interaction object near the intersection position, making it possible to provide a more intuitive and natural interaction experience. The virtual cursor may be of any shape and style, and may be designed and adjusted according to specific application requirements. When the user performs the finger pinch gesture, the virtual ray is generated and directed towards the interface position, and at the same time the virtual cursor is generated on its path, to provide clear visual feedback. The generation of the virtual ray and the virtual cursor that implemented in this manner may provide a more natural, intuitive and interesting interaction experience in the three-dimensional environment.

In some embodiments, the virtual cursor includes any one of the following: a focus indicator cursor, a stereo cursor, an animated cursor, a trail cursor, a color cursor, and a transparent cursor.

For example, the focus indicator cursor may be a halo, a shadow, or a highlighted graphical symbol (such as a square, a circle, or a triangle), to indicate a current interaction position in the interface. The focus indicator cursor may be presented around or adjacent to the interaction object near the intersection position (i.e., an end point of the virtual ray). The focus indicator cursor may be customized, such as by changing its brightness, color, size, shape, etc., to adapt to different interface designs and user experience requirements.

For example, as shown in FIG. 2 and FIG. 3, a user interaction interface 1 is displayed in the three-dimensional environment. Pinch point position coordinates 211 may be obtained based on a finger pinch gesture 21 of a current object, where the pinch point position coordinates 211 may be used as a ray start point 31 of a virtual ray 3. The virtual ray 3 is generated in the three-dimensional environment, and a virtual cursor 33 is generated at an intersection position 32 of the virtual ray 3 and the user interaction interface 1, where the virtual cursor 33 may be a halo. The interaction object in the user interaction interface is confirmed to be selected in response to the finger pinch gesture. In this way, there is clear physical feedback for a selection moment, and a clear virtual cursor feedback is provided for the user as the clear physical feedback.

For example, the stereo cursor may use a three-dimensional (3D) graphics technology to allow the three-dimensional cursor to be displayed in the interface in a more stereoscopic manner, so as to make the user feel more real and immersed. The shape and size of the stereo cursor may be customized through software, or may be dynamically changed based on an operational behavior of the user.

For example, the animated cursor may be displayed through an animation effect, such as by turning into a constantly flashing bulb or a continuously spinning top, in order to attract attention of the user. The animated cursor may also dynamically change based on the operational behavior of the user.

For example, the trail cursor may leave a trail line when the user performs the finger pinch gesture and moves, thus giving the user a better understanding of their operational behavior and position. The color, thickness, and length of the trail line may be customized through software.

Figure 4:
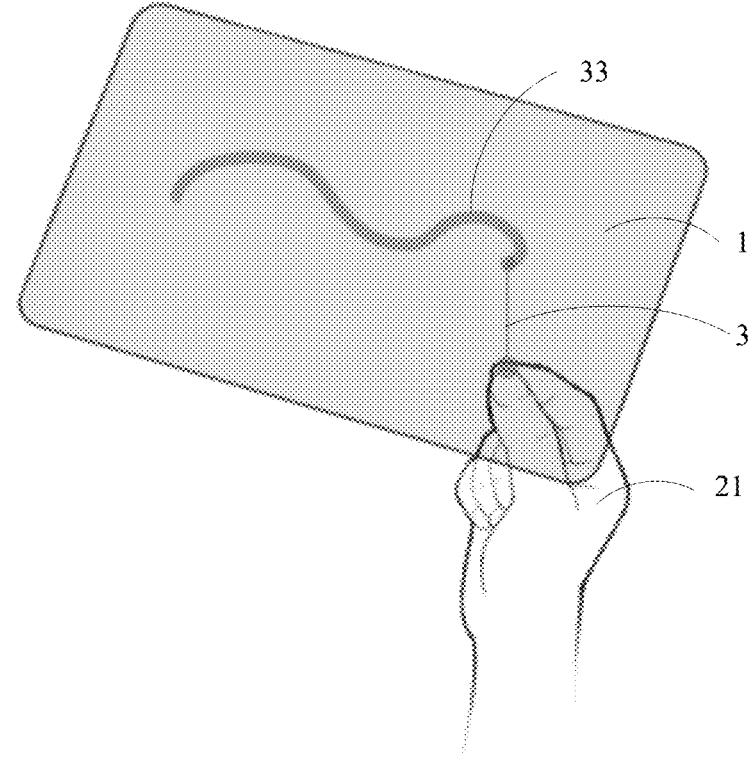
FIG. 4 is a schematic diagram of a third application scenario of the interaction method according to an embodiment of the present application.

For example, as shown in FIG. 4, when the user performs the finger pinch gesture 21 and moves, the virtual ray 3 is generated in the three-dimensional environment, and the virtual cursor 33 is generated at the intersection position of the virtual ray 3 and the user interaction interface 1, where the virtual cursor 33 may be the trail cursor.

For example, the color cursor may be used to differentiate elements or states by different colors, such as by displaying a green cursor around a clickable interaction object and a gray cursor around a non-clickable interaction object in the user interaction interface.

For example, the transparent cursor may be set to a semitransparent state, so that the user can see an element and interface beneath the cursor, and thus have a better understanding of the position and target of an operation of the user. For example, the element may be a virtual character, a virtual animal, a virtual entity, virtual environment content, a virtual control, an interface element, a virtual prop, etc. displayed in the user interaction interface.

The types of the virtual cursor described above are all designed to provide a better user experience and interaction effect. In actual application, an appropriate cursor type may be configured depending on requirements and scenarios.

In some embodiments, the generating the virtual ray in the three-dimensional environment based on the interface position, the pinch point position coordinates, and the finger pinch gesture includes:

in response to the finger pinch gesture, generating a ray start point of the virtual ray based on the pinch point position coordinates of the pinch point of the finger pinch gesture in the three-dimensional environment;

determining the ray direction of the virtual ray based on a position relationship between the interface position and the pinch point position coordinates; and generating the virtual ray in the three-dimensional environment based on the ray start point and the ray direction.

Figures 5, 6:
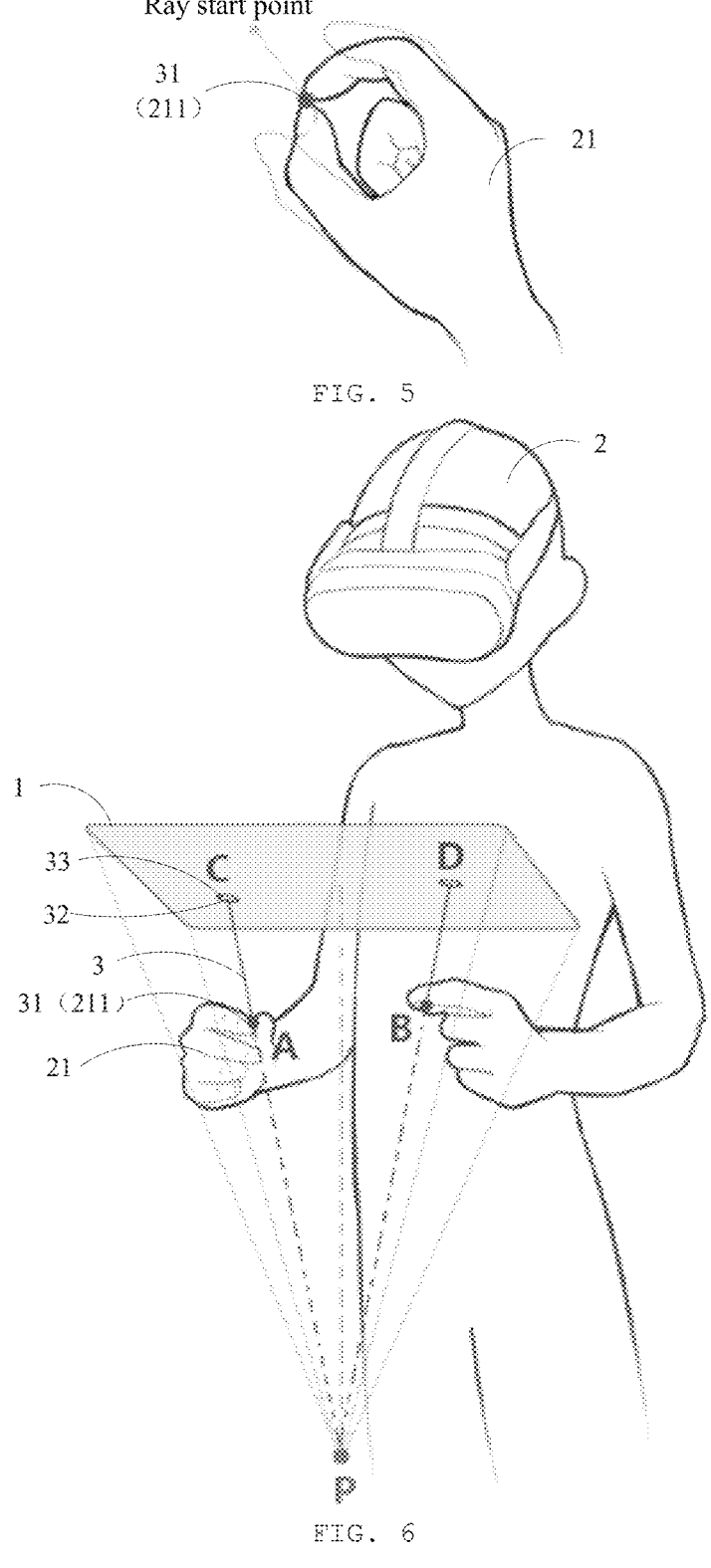
FIG. 5 is a schematic diagram of a fourth application scenario of the interaction method according to an embodiment of the present application.
FIG. 6 is a schematic diagram of a fifth application scenario of the interaction method according to an embodiment of the present application.

For example, as shown in FIG. 5, when the user performs the finger pinch gesture, the virtual reality device may capture the hand image information through the image sensor. The finger pinch gesture 21 may be recognized by analyzing and processing the image information, and the pinch point position coordinates 211 may be obtained. The pinch point position coordinates 211 may be used as the ray start point 31 of the virtual ray 3.

For example, the ray direction of the virtual ray may be determined based on the position relationship between the interface position and the pinch point position coordinates. The position relationship may be relatively fixed, or may be dynamically adjusted based on motion and position information of the user. For example, if the pinch point is below the interface position, the ray may be emitted upward; or if the pinch point is on the right of the interface position, the ray may be emitted to the left.

For example, the virtual ray may be generated in the three-dimensional environment based on the ray start point and the ray direction. The generation process may be implemented through the generation engine of the virtual reality device. A generation result may be a virtual light ray or similar ray visual effects that allow the user to see and perceive the presence of the virtual ray.

In some embodiments, the generating a ray start point of the virtual ray further includes:

adjusting a generation position of the ray start point of the virtual ray in real time based on a displacement change of the pinch point position coordinates generated by an associated operation instruction of the finger pinch gesture.

For example, in order to implement a more flexible and real-time interaction operation, the generation position of the ray start point of the virtual ray may be dynamically adjusted based on the associated operation instruction of the finger pinch gesture. This associated operation instruction may be an input signal from the user, for example, the input instruction is based on hand movement operations such as clicking, dragging, and zooming, and may also include other interaction operations with the three-dimensional environment.

For example, when the user performs the finger pinch gesture, the virtual reality device captures motion and position information of the gesture, and generates the ray start point of the virtual ray therefrom. However, operation instructions from the user are not limited to the finger pinch gesture, but may also include other interaction operations with the three-dimensional environment. These operation instructions may be transmitted as input signals to the virtual reality device, for real-time adjustment of the generation position of the ray start point of the virtual ray. For example, when the user performs other associated operation instructions, for example, operations such as clicking, dragging, or zooming, the virtual reality device may capture motion and position information of these operations. An intention of the user and a target position may be obtained by analyzing and processing the information. Then, the generation position of the ray start point of the virtual ray may be adjusted in real time based on the information.

For example, when the user keeps the finger pinch gesture moving from one position to another position in the three-dimensional environment, a movement distance and direction may be determined by capturing a movement trajectory of fingers in the three-dimensional environment. The generation position of the ray start point of the virtual ray may be adjusted in real time based on the information, so that the generation position follows the movement trajectory of the fingers. Similarly, when the user performs a zooming operation, pinching and spreading motions of fingers may be captured, and the generation position and size of the ray start point of the virtual ray may be adjusted in real time based on these motions. In this way, the user can generate and adjust the ray start point of the virtual ray through the finger pinch gesture and other associated operation instructions, and perform various interaction operations in the three-dimensional environment. This interaction mode can provide a more flexible and real-time experience, so that the user can interact with the three-dimensional environment more naturally. In addition, it can bring more innovative ways of playing and interaction possibilities for virtual reality applications.

In some embodiments, the determining the ray direction of the virtual ray based on a position relationship between the interface position and the pinch point position coordinates includes: if the pinch point position coordinates are below the interface position, determining that the ray direction of the virtual ray is upward; or if the pinch point position coordinates are above the interface position, determining that the ray direction of the virtual ray is downward.

In some embodiments, the generating the virtual ray in the three-dimensional environment based on the ray start point and the ray direction further includes: generating, if the ray direction of the virtual ray is upward, the virtual ray below the user interaction interface based on the ray start point and the ray direction; or generating, if the ray direction of the virtual ray is downward, the virtual ray above the user interaction interface based on the ray start point and the ray direction.

For example, as shown in FIG. 2, if the pinch point position coordinates 211 are below the interface position, that is, the hand performing the finger pinch gesture 21 is below the user interaction interface 1, it is determined that the ray direction of the virtual ray 3 is upward, and the virtual ray 3 is then generated below the user interaction interface 1 based on the ray start point 31 and the ray direction.

For example, as shown in FIG. 3, if the pinch point position coordinates 211 are above the interface position, that is, the hand performing the finger pinch gesture 21 is above the user interaction interface 1, it is determined that the ray direction of the virtual ray 3 is downward, and the virtual ray 3 is then generated above the user interaction interface 1 based on the ray start point 31 and the ray direction.

In some embodiments, the generating, if the ray direction of the virtual ray is upward, the virtual ray below the user interaction interface based on the ray start point and the ray direction includes: configuring a first pyramidal spatial structure in the three-dimensional environment if the ray direction of the virtual ray is upward, where the first pyramidal spatial structure includes a first origin, a first cross-section, and a second cross-section, the first cross-section is smaller than the second cross-section, the pinch point position coordinates are on the first cross-section, and the interface position is on the second cross-section; casting a ray from the first origin to the pinch point position coordinates along the ray direction to intersect with the interface position of the user interaction interface, and determining an intersection position as a ray end point of the virtual ray; and generating the virtual ray below the user interaction interface based on the ray start point and the ray end point.

For example, as shown in FIG. 6, if the ray direction of the virtual ray 3 is upward, a first pyramidal spatial structure of a first preset shape is configured in the three-dimensional environment. The first preset shape may include any one of a rectangular pyramid, a pentagonal pyramid, a hexagonal pyramid, a cone, etc., for example, the preset shape is a rectangular pyramid. The first pyramidal spatial structure includes a first origin P, a first cross-section (not shown in the figure), and a second cross-section (not shown in the figure), where the first cross-section is smaller than the second cross-section, the pinch point position coordinates 211 of the finger pinch gesture 21 are on the first cross-section, and the interface position of the user interaction interface 1 is on the second cross-section. When the hand of a current object 2 (user) is below the user interaction interface 1, a ray is cast and extends from the first origin P to the pinch point position coordinates 211 (points A and B shown in the figure) along the ray direction, to intersect with the interface position of the user interaction interface 1. An intersection position is determined as a ray end point 32 (points C and D shown in the figure) of the virtual ray 3. The virtual ray 3 (rays AC and BD shown in the figure) is generated below the user interaction interface 1 based on the ray start point 31 and the ray end point 32, and the virtual cursor 33 is generated at the ray end point 32 (points C and D shown in the figure). A shorter distance between the hand of the current object 2 (user) and the first origin P indicates lower energy consumption and also lower accuracy. On the contrary, a longer distance between the hand of the current object and the first origin P indicates higher energy consumption and higher accuracy. In this process, a system performs speed-based computation. For example, when the hand of the current object 2 (user) moves slowly, the virtual cursor 33 moves precisely with the hand in the user interaction interface 1. However, when the hand of the current object 2 (user) moves faster, the virtual cursor 33 moves a long distance in the user interaction interface 1. The faster the speed, the longer distance that the virtual cursor 33 moves.

The first origin P may be determined based on a user-defined position parameter or a system default parameter. The first origin P may alternatively be determined based on the size or height of the user interaction interface 1.

In some embodiments, the generating, if the ray direction of the virtual ray is downward, the virtual ray above the user interaction interface based on the ray start point and the ray direction includes: configuring a second pyramidal spatial structure in the three-dimensional environment if the ray direction of the virtual ray is downward, where the second pyramidal spatial structure includes a second origin, a third cross-section, and a fourth cross-section, the third cross-section is smaller than the fourth cross-section, the pinch point position coordinates are on the third cross-section, and the interface position is on the fourth cross-section; casting a ray from the second origin to the pinch point position coordinates along the ray direction to intersect with the interface position of the user interaction interface, and determining an intersection position as a ray end point of the virtual ray; and generating the virtual ray above the user interaction interface based on the ray start point and the ray end point.

Figure 7:
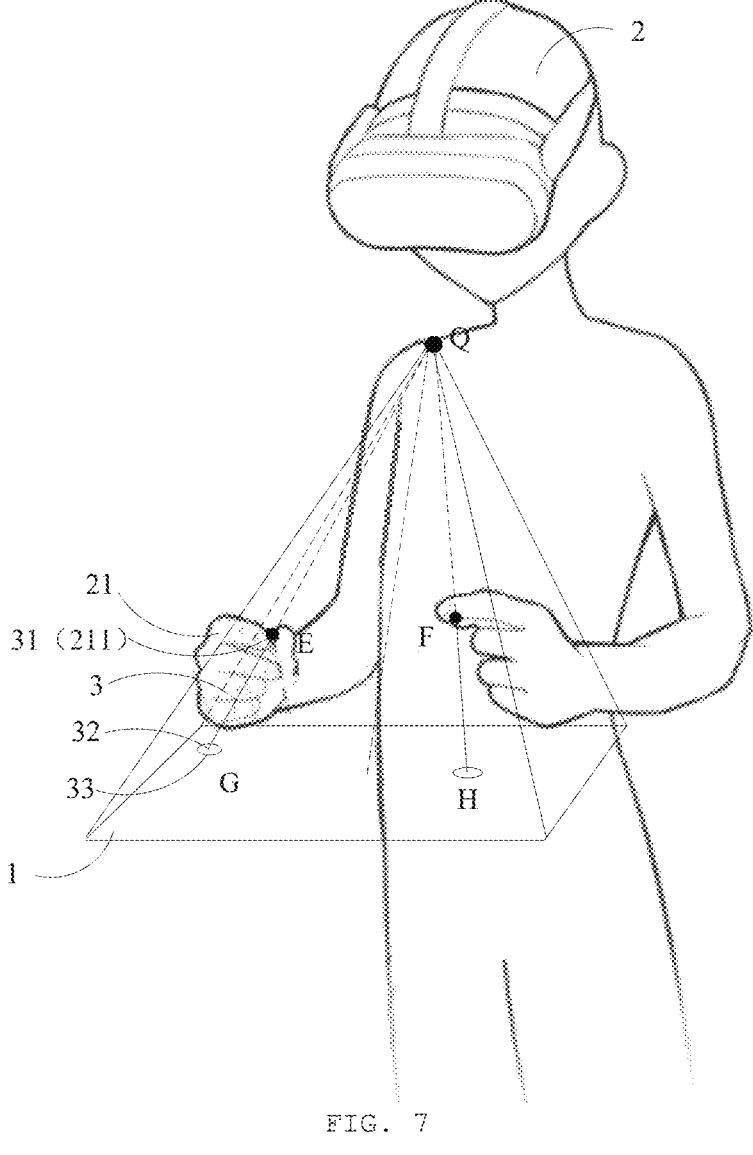
FIG. 7 is a schematic diagram of a sixth application scenario of the interaction method according to an embodiment of the present application.

For example, as shown in FIG. 7, if the ray direction of the virtual ray 3 is downward, a second pyramidal spatial structure of a second preset shape is configured in the three-dimensional environment. For example, the second preset shape may include any one of a rectangular pyramid, a pentagonal pyramid, a hexagonal pyramid, a cone, etc., for example, the second preset shape is a rectangular pyramid. The second pyramidal spatial structure includes a second origin Q, a third cross-section (not shown in the figure), and a fourth cross-section (not shown in the figure), where the third cross-section is smaller than the fourth cross-section, the pinch point position coordinates 211 of the finger pinch gesture 21 are on the third cross-section, and the interface position of the user interaction interface 1 is on the fourth cross-section. When the hand of the current object 2 (user) is above the user interaction interface 1, a ray is cast and extends from the second origin Q to the pinch point position coordinates 211 (points E and F shown in the figure) along the ray direction, to intersect with the interface position of the user interaction interface 1. An intersection position is determined as a ray end point 32 (points G and H shown in the figure) of the virtual ray 3. The virtual ray 3 (rays EG and FH shown in the figure) is generated above the user interaction interface 1 based on the ray start point 31 and the ray end point 32, and the virtual cursor 33 is generated at the ray end point 32 (points G and H shown in the figure).

The second origin Q may be determined based on a user-defined position parameter or a system default parameter. The second origin Q may alternatively be determined based on the size or height of the user interaction interface 1.

The interface position of the user interaction interface 1 may also be adjusted in real time based on hand movement and head position information of the current object 2. Therefore, the ray start point 31 and the ray end point 32 of the generated virtual ray 3 will also be adjusted in real time based on the hand movement and head position information of the current object 2 or the changed interface position of the user interaction interface 1. For example, when the user raises the head and looks straight ahead, the interface position of the user interaction interface 1 may be changed to a position in front of the current object 2. For example, if the current object 2 lies flat and looks up, the interface position of the user interaction interface 1 may be changed to be directly above the current object 2. For example, when the current object 2 lies flat in a room and looks up at the ceiling, the user interaction interface 1 is projected onto the ceiling.

In some embodiments, the finger pinch gesture includes one of a one-handed pinch gesture and a two-handed pinch gesture. The generating the virtual ray in the three-dimensional environment based on the interface position, the pinch point position coordinates, and the finger pinch gesture includes: if the finger pinch gesture is the one-handed pinch gesture, generating one virtual ray in the three-dimensional environment based on the interface position, the pinch point position coordinates, and the one-handed pinch gesture; or if the finger pinch gesture is the two-handed pinch gesture, generating two virtual rays in the three-dimensional environment based on the interface position, the pinch point position coordinates, and the two-handed pinch gesture.

For example, when the user performs the one-handed pinch gesture, the system may generate one virtual ray in the three-dimensional environment based on the interface position and the pinch point coordinates, as well as information such as the direction and speed of the gesture. The virtual ray may be used to implement some one-handed operations, such as selecting, dragging, zooming in or out, and clicking.

For example, in a graffiti application scenario shown in FIG. 4 that is implemented based on the operation of the one-handed pinch gesture, the one-handed pinch gesture may be used to control the virtual cursor 33 corresponding to the virtual ray 3 to move in the user interaction interface 1, thereby implementing operations such as painting and writing notes.

However, for example, when the user performs the two-handed pinch gesture, the system may generate two virtual rays in the three-dimensional environment based on the interface position and two sets of pinch point coordinates, as well as information such as the directions and speeds of two gestures. The two virtual rays may be used to implement some two-handed operations, such as rotating, zooming, panning, and two-handed synchronous input, which are suitable for a high-frequency input scenario.

Figure 8:
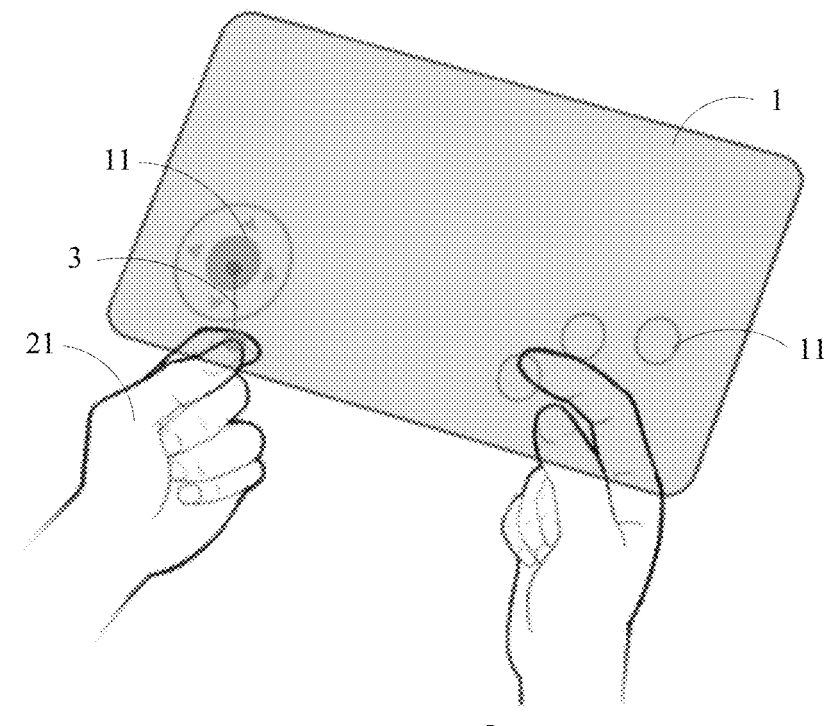
FIG. 8 is a schematic diagram of a seventh application scenario of the interaction method according to an embodiment of the present application.

In a game application scenario shown in FIG. 8 that is implemented based on the operation of the two-handed pinch gesture, the two-handed pinch gesture may be used to control the virtual ray 3 to mimic a game joystick, to select and manipulate a virtual control 11 in the user interaction interface 1 to trigger corresponding skills, thereby implementing a game control operation.

Figure 9:
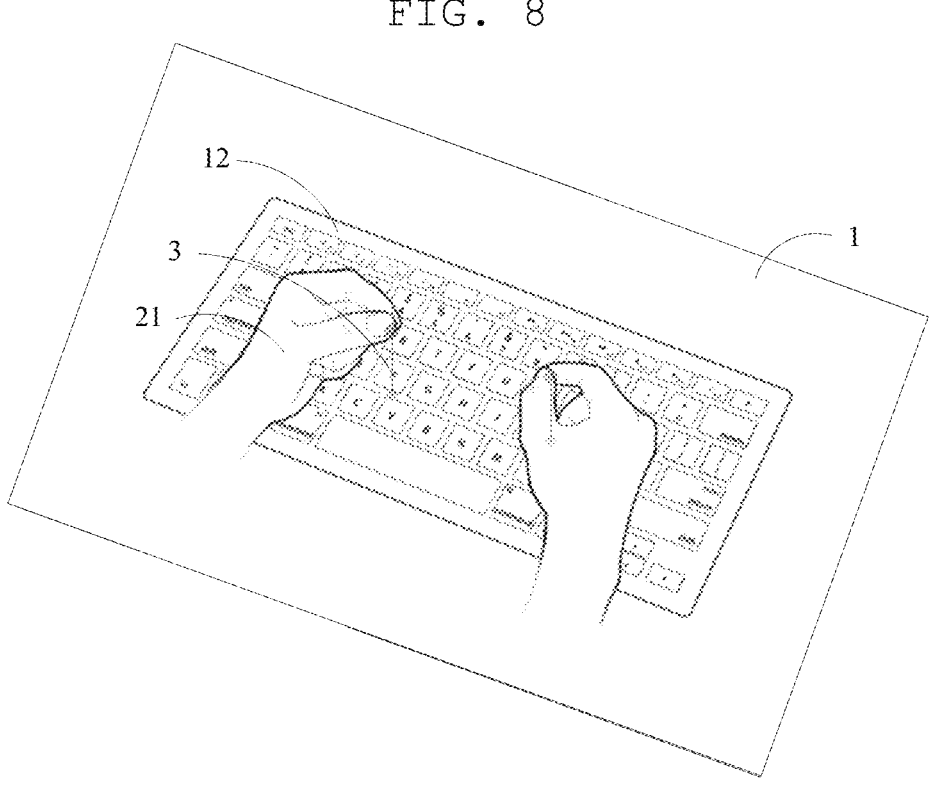
FIG. 9 is a schematic diagram of an eighth application scenario of the interaction method according to an embodiment of the present application.

In a keyboard input application scenario shown in FIG. 9 that is implemented based on the operation of the two-handed pinch gesture, the two-handed pinch gesture may be used to control the virtual ray 3 to interact with a virtual keyboard 12 in the user interaction interface 1, thereby implementing two-handed synchronous input.

This interaction mode of generating the virtual ray based on the finger pinch gesture may be applied to a variety of scenarios, which not only improves the efficiency and accuracy of interaction, but also enhances the sense of immersion and experience of the user. Regardless of whether the user operates with one or both hands, the user can enjoy the convenience and fun of this innovative interaction mode.

In some embodiments, the method further includes: hiding the virtual ray when a distance between the interface position and the pinch point position coordinates is less than a distance threshold.

Figure 10:
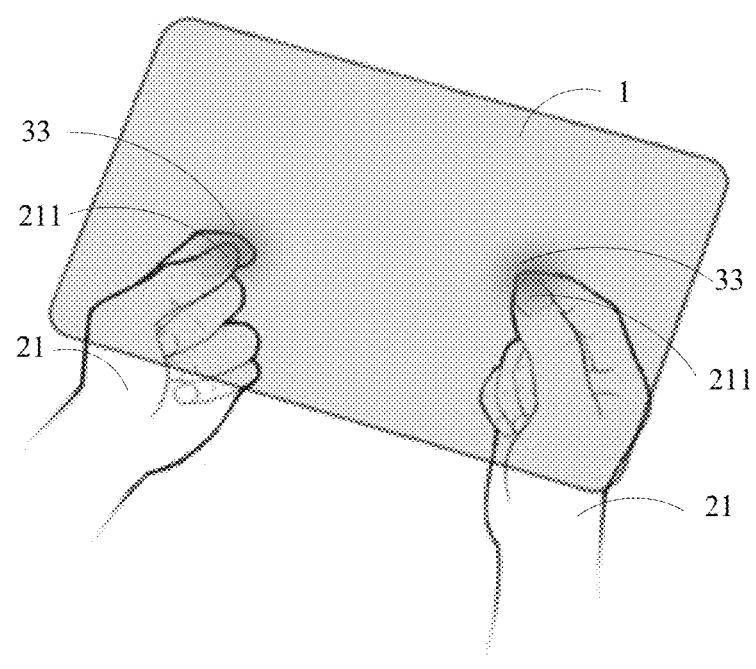
FIG. 10 is a schematic diagram of a ninth application scenario of the interaction method according to an embodiment of the present application.
Figure 11:
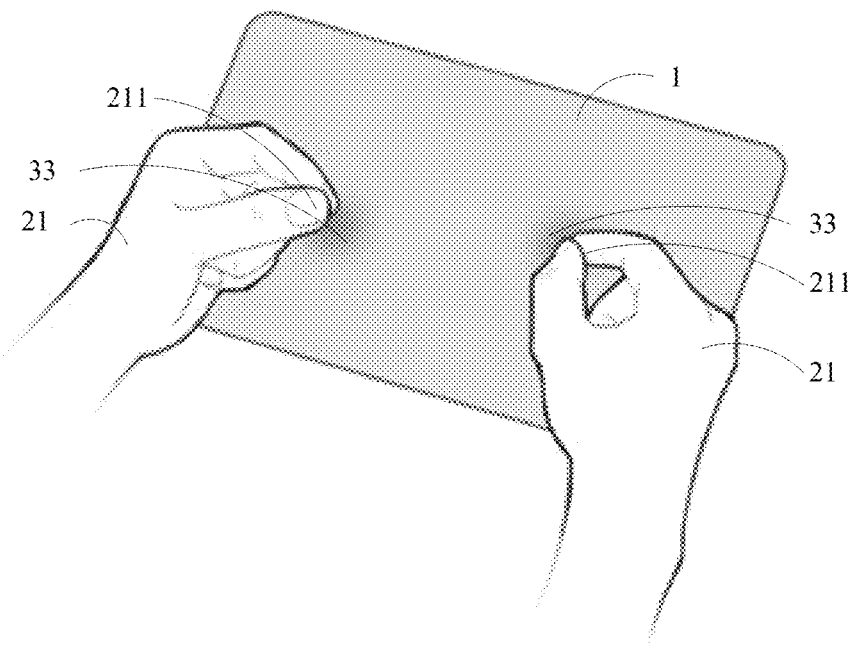
FIG. 11 is a schematic diagram of a tenth application scenario of the interaction method according to an embodiment of the present application.

For example, as shown in FIG. 10 and FIG. 11, when the distance between the interface position and the pinch point position coordinates 211 is less than the distance threshold, the virtual ray 3 is hidden, which can prevent the interaction experience of the user from being affected due to the virtual ray 3 being too close to the interface. After the virtual ray 3 is hidden, the virtual cursor 33 may further be displayed in the user interaction interface 1, to provide clear visual feedback.

In the embodiments of the present application, the distance threshold may be set by the system, or may be user-defined. The magnitude of the distance threshold may be adjusted depending on application scenarios and user requirements. For example, the distance threshold may be 1 centimeter. When a finger is close enough to the user interaction interface, the virtual ray may disappear, enabling a seamless transition to direct pinch interaction.

Step 150: Complete a related interaction operation in the user interaction interface based on the gesture and the visual indication.

For example, a corresponding operation is performed in the user interaction interface based on the gesture of the user and the visual indication. For example, if the user selects an icon with the pinch gesture, a processor zooms in the icon or opens a menu including the icon. This interaction mode based on the gesture and the visual indication makes interaction in the virtual reality environment more diverse and interesting, allowing the user to immerse themselves in the virtual environment more naturally and deeply. In addition, the clear visual feedback and tactile feedback also greatly improve the sense of realism of the user experience.

In some embodiments, the completing a related interaction operation in the user interaction interface based on the gesture and the visual indication includes:

performing an interaction operation in the user interaction interface based on an associated operation instruction of the finger pinch gesture and the virtual ray, and displaying an interaction operation result in the user interaction interface.

A variety of interaction operations may be performed in the user interaction interface based on the associated operation instruction of the finger pinch gesture and the virtual ray, and the interaction operation result may be displayed in the user interaction interface in real time. The system generates an associated operation instruction based on the virtual ray and the interaction operation in the user interaction interface. Such an associated operation instruction may be selecting, dragging, zooming in, zooming out, rotating, entering, deleting, etc., depending on intentions and requirements of the user. Once the associated operation instruction is generated, the system immediately applies same to the user interaction interface. For example, if the user performs the one-handed pinch gesture and selects an icon, the system moves the icon to a user-specified position based on information such as the direction and speed of the one-handed pinch gesture. If the user performs the two-handed pinch gesture and rotates a 3D model, the system rotates the model based on information such as the direction and speed of the two-handed pinch gesture. At the same time, the system displays all interaction operation results in the user interaction interface. These results may be in the form of text, images, videos, audio, etc., depending on the user requirements and the design of the user interaction interface. The sense of immersion and experience of the user can be enhanced by displaying the interaction operation result in the user interaction interface in real time.

In addition, in order to improve the efficiency and accuracy of interaction, the system may also generate the associated operation instruction based on several different types of input information. For example, if the user inputs signals of other modalities, such as voice or eye movements, when performing the finger pinch gesture, the system may also take these signals into account, to generate a more accurate and personalized associated operation instruction.

A novel, natural, and efficient virtual interaction mode can be created based on the associated operation instruction of the finger pinch gesture and the virtual ray, as well as the interaction operation and result display in the user interaction interface. This interaction mode can not only improve the sense of immersion and experience of the user, but can also be widely applied in virtual reality, augmented reality, smart home, and other fields.

In some embodiments, the method further includes: generating the associated operation instruction based on multi-modal input information, where the multi-modal input information includes at least one of hand movement information, body posture information, eye movement information, voice information, lip movement information, biometric information, and environmental information.

The interaction operation performed in the user interaction interface based on the associated operation instruction of the finger pinch gesture and the virtual ray is a new human-computer interaction mode. This mode implements the operation and interaction in the user interaction interface by generating the associated operation instruction via recognizing the hand movement information, such as the finger pinch gesture, of the user, and in combination with other multi-modal input information such as the body posture information, the eye movement information, the voice information, the lip movement information, the biometric information, and the environmental information.

In specific implementations of the present application, relevant data such as the hand movement information, the body posture information, the eye movement information, the voice information, the lip movement information, and the biometric information of the user is involved. When the above embodiments of the present application are applied to specific products or technologies, user permission or consent is required, and the collection, use, and processing of the relevant data must comply with relevant laws, regulations, and standards of relevant countries and regions.

For example, the hand movement information may include bending and spreading of the fingers, rotation and twist of the palm, and movement of the fingers, the palm, the arm, etc. An associated operation instruction corresponding to a specific interaction operation may be generated by recognizing these motions. For example, a pinch gesture may indicate the selection of a virtual object or the triggering of a specific function. For example, an associated operation instruction may be generated by recognizing the finger pinch gesture, so that the user can grab and operate an object in the virtual environment. For example, an associated operation instruction such as for zooming out or zooming in an element in the user interaction interface may be triggered by recognizing the finger pinch gesture.

For example, the body posture information may include standing, sitting, turning, lying, etc. of the user. The body posture information may be used to generate an associated operation instruction for adjusting parameters such as the angle and position of the user interaction interface, or an associated operation instruction for triggering an interaction operation related to a body posture. For example, when the user leans forward, the user interaction interface may automatically scroll or switch to a next page. For example, an associated operation instruction may be generated by recognizing the direction and posture of the user body, so that the user can control the direction and action of a character in the virtual environment.

For example, the eye movement information may include a gaze direction, a gaze point, etc. of the user. The eye movement information may be used to generate an associated operation instruction for navigating and selecting a virtual object in the user interaction interface, or an associated operation instruction for triggering a specific interaction operation. For example, an associated operation instruction may be generated by recognizing the gaze point of the eyes of the user, so that the user can select a virtual object a in the user interaction interface by gazing at the virtual object a, and then perform interaction operations through other gestures or voice commands. For example, if the user focuses on an element b in the user interaction interface, the system may trigger a further operation on or a detailed display of the element b.

For example, the voice information may include a voice command, a mouth shape, etc. of the user. The voice information may be used to generate associated operation instructions of interaction operations such as inputting text and controlling a virtual object. For example, an associated operation instruction may be generated by recognizing the voice command of the user, so that the user can confirm the selection or execution of an operation by voice, or talk to a virtual scene or control a virtual character by voice. For example, the user may say "Open email" to trigger the start of an email client in the user interaction interface.

For example, the lip movement information may include a lip movement, a mouth shape, etc. of the user. The lip movement information may be used to generate an associated operation instruction for inputting specific text or commands into the user interaction interface, or to complement other voice inputs. For example, the user can quickly input some specific letters or words in the user interaction interface through the lip movement. For example, an associated operation instruction may be generated by recognizing the lip movement of the user, and the system can recognize the mouth shape of the user, thereby performing operations related to the mouth shape, such as lip-syncing singing, lip-syncing subtitle outputting, etc.

For example, the biometric information may include physiological parameters such as a blood pressure, a heart rate, and a skin resistance of the user. The biometric information may be used to generate associated operation instructions of interaction operations such as health monitoring and identity authentication. For example, when the blood pressure of the user is excessively high, the user interaction interface may automatically pop up a health tip or notify the user to take a rest. For example, an associated operation instruction may be generated by monitoring the blood pressure and heart rate of the user, and the system can adjust background music or a color effect of the user interaction interface based on a change in the blood pressure or heart rate of the user, to provide a more personalized experience.

For example, the environmental information may include environmental parameters such as temperature, humidity, light, and sound. The environmental information may be used to generate an associated operation instruction for adjusting parameters such as the brightness and volume of the user interaction interface, or an associated operation instruction for triggering an interaction operation related to an environment. For example, an associated operation instruction may be generated by recognizing a scenario where the user is located and the light, and the system can adjust the brightness and contrast of the user interaction interface based on the ambient light, to provide a more comfortable visual experience.

The associated operation instruction is generated based on the multi-modal input information, which means that the system takes several different types of input information into account, and can more accurately reflect the intentions and requirements of the user. The associated operation instruction is generated based on several different types of input information, so that virtual interaction can be more natural, accurate, and personalized. In addition, the sense of immersion and experience of the user can be enhanced by displaying the interaction operation result in the user interaction interface.

According to the interaction mode that is implemented for the near-field user interaction interface through gravity pinch in the embodiments of the present application, the hand does not need to touch the interface, but may be kept at a specific distance from the interface, the virtual ray is generated by performing the finger pinch gesture above or below the user interaction interface, and an indirect interaction operation is performed in the user interaction interface based on the associated operation instruction of the finger pinch gesture and the virtual ray. The hand may be placed on the top of a desk or on a leg for performing the interaction operation, which reduces energy consumption. Moreover, the hand position is friendly to gesture tracking, and the finger pinch gesture with the thumb and index finger facing the camera has a high recall rate. In addition, when the hand is placed below the user interaction interface, no interface content is covered, which improves the user experience. By using the interaction mode based on gravity pinch, the user can easily operate the user interaction interface to implement various interaction operations, such as selecting, dragging, and zooming, and the operation is relatively simple. This interaction mode may be used to conveniently perform virtual interaction operations in different scenarios, such as in offices, homes, public places, and educational training places, and has good adaptability. In addition, since the hand does not need to touch the interface, problems such as bacterial cross infection caused by touch can be avoided, which improves the safety of interaction. This near-field virtual interaction mode based on gravity pinch is an innovative interaction mode, and can bring a brand new use experience for the user.

All of the above technical solutions may be combined in any way, to form optional embodiments of the present application, and details are not described again herein.

In the embodiments of the present application, the three-dimensional environment generated by the virtual reality device is displayed; the user interaction interface is presented in the three-dimensional environment; the gesture of the current object is recognized; the visual indication which points to the user interaction interface from the gesture is displayed based on the user interaction interface and the position of the gesture; and the related interaction operation is completed in the user interaction interface based on the gesture and the visual indication. According to the embodiments of the present application, the visual indication may be generated through the gesture, to provide clear visual feedback, and the related interaction operation may be completed in the user interaction interface based on the gesture and the visual indication, making interaction in the three-dimensional environment more diverse and interesting, thereby improving the immersive experience of users.

Figures 12, 13, 14:
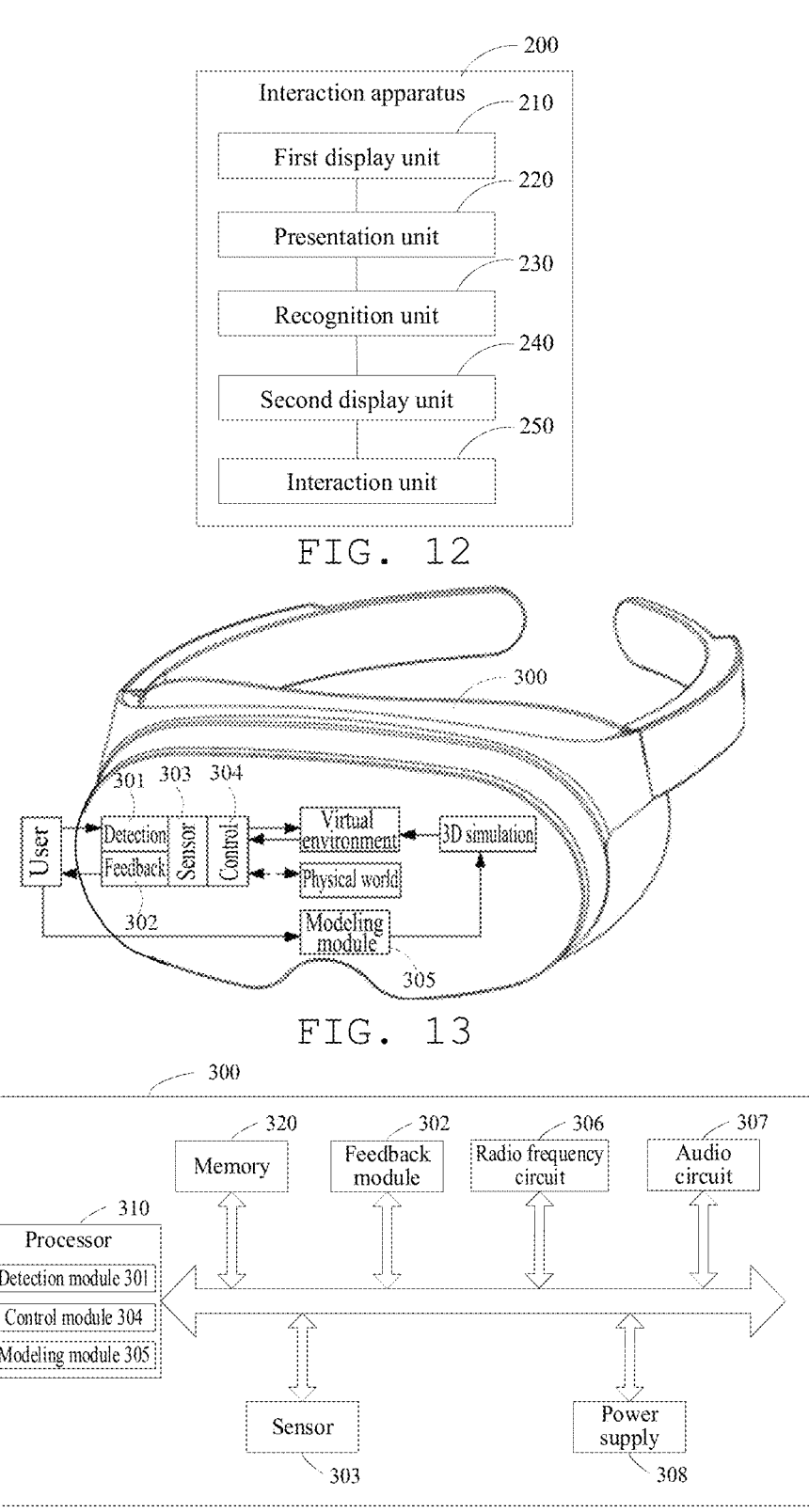
FIG. 12 is a schematic diagram of a structure of an interaction apparatus according to an embodiment of the present application.
FIG. 13 is a schematic diagram of a first structure of a terminal device according to an embodiment of the present application.
FIG. 14 is a schematic diagram of a second structure of the terminal device according to an embodiment of the present application.

For ease of better implementing the interaction method in the embodiments of the present application, an embodiment of the present application further provides an interaction apparatus. Referring to FIG. 12, FIG. 12 is a schematic diagram of a structure of an interaction apparatus according to an embodiment of the present application. The interaction apparatus 200 may include:

a first display unit 210 configured to display a three-dimensional environment generated by a virtual reality device;

a presentation unit 220 configured to present a user interaction interface in the three-dimensional environment;

a recognition unit 230 configured to recognize a gesture of a current object;

a second display unit 240 configured to display, based on the user interaction interface and a position of the gesture, a visual indication which points to the user interaction interface from the gesture; and an interaction unit 250 configured to complete a related interaction operation in the user interaction interface based on the gesture and the visual indication.

In some embodiments, the recognition unit 230 is configured to: recognize a finger pinch gesture of the current object, and obtain pinch point position coordinates of a pinch point of the finger pinch gesture in the three-dimensional environment.

In some embodiments, the visual indication includes a virtual ray and a virtual cursor.

The second display unit 240 is configured to: obtain an interface position of the user interaction interface in the three-dimensional environment; and generate the virtual ray in the three-dimensional environment based on the interface position, the pinch point position coordinates, and the finger pinch gesture, and generate a virtual cursor at an intersection position of the virtual ray and the user interaction interface, where the virtual ray has a ray direction from the pinch point position coordinates toward the interface position.

In some embodiments, the second display unit 240 is configured to: in response to the finger pinch gesture, generate a ray start point of the virtual ray based on the pinch point position coordinates of the pinch point of the finger pinch gesture in the three-dimensional environment; determine the ray direction of the virtual ray based on a position relationship between the interface position and the pinch point position coordinates; and generate the virtual ray in the three-dimensional environment based on the ray start point and the ray direction.

In some embodiments, when determining the ray direction of the virtual ray based on the position relationship between the interface position and the pinch point position coordinates, the second display unit 240 may be configured to: if the pinch point position coordinates are below the interface position, determine that the ray direction of the virtual ray is upward; or if the pinch point position coordinates are above the interface position, determine that the ray direction of the virtual ray is downward.

In some embodiments, when generating the virtual ray in the three-dimensional environment based on the ray start point and the ray direction, the second display unit 240 may be configured to: generate, if the ray direction of the virtual ray is upward, the virtual ray below the user interaction interface based on the ray start point and the ray direction; or generate, if the ray direction of the virtual ray is downward, the virtual ray above the user interaction interface based on the ray start point and the ray direction.

In some embodiments, the second display unit 240 may be configured to: configure a first pyramidal spatial structure of a preset shape that is used for representing a gesture sensing region in the three-dimensional environment if the ray direction of the virtual ray is upward, where the first pyramidal spatial structure includes a first origin, a first cross-section, and a second cross-section, the first cross-section is smaller than the second cross-section, the first origin is determined based on the farthest sensing point in the gesture sensing region, the pinch point position coordinates are on the first cross-section, and the interface position is on the second cross-section; cast a ray from the first origin to the pinch point position coordinates along the ray direction to intersect with the interface position of the user interaction interface, and determine an intersection position as a ray end point of the virtual ray; and generate the virtual ray below the user interaction interface based on the ray start point and the ray end point.

In some embodiments, the second display unit 240 may be configured to: configure a second pyramidal spatial structure of a preset shape that is used for representing a visual range in the three-dimensional environment if the ray direction of the virtual ray is downward, where the second pyramidal spatial structure includes a second origin, a third cross-section, and a fourth cross-section, the third cross-section is smaller than the fourth cross-section, the second origin is determined based on an eye position of the current object, the pinch point position coordinates are on the third cross-section, and the interface position is on the fourth cross-section; cast a ray from the second origin to the pinch point position coordinates along the ray direction to intersect with the interface position of the user interaction interface, and determine an intersection position as a ray end point of the virtual ray; and generate the virtual ray above the user interaction interface based on the ray start point and the ray end point.

In some embodiments, when generating the ray start point of the virtual ray, the second display unit 240 may further be configured to: adjust a generation position of the ray start point of the virtual ray in real time based on a displacement change of the pinch point position coordinates generated by an associated operation instruction of the finger pinch gesture.

In some embodiments, the finger pinch gesture includes one of a one-handed pinch gesture and a two-handed pinch gesture. When generating the virtual ray in the three-dimensional environment based on the interface position, the pinch point position coordinates, and the finger pinch gesture, the second display unit 240 may be configured to: if the finger pinch gesture is the one-handed pinch gesture, generate one virtual ray in the three-dimensional environment based on the interface position, the pinch point position coordinates, and the one-handed pinch gesture; or if the finger pinch gesture is the two-handed pinch gesture, generate two virtual rays in the three-dimensional environment based on the interface position, the pinch point position coordinates, and the two-handed pinch gesture.

In some embodiments, the second display unit 240 is further configured to: hide the virtual ray when a distance between the interface position and the pinch point position coordinates is less than a distance threshold.

In some embodiments, the virtual cursor includes any one of the following: a focus indicator cursor, a stereo cursor, an animated cursor, a trail cursor, a color cursor, and a transparent cursor.

In some embodiments, the interaction unit 250 is configured to: perform an interaction operation in the user interaction interface based on an associated operation instruction of the finger pinch gesture and the visual indication, and display an interaction operation result in the user interaction interface.

In some embodiments, the interaction unit 250 is further configured to: generate the associated operation instruction based on multi-modal input information, where the multi-modal input information includes at least one of hand movement information, body posture information, eye movement information, voice information, lip movement information, biometric information, and environmental information.

All or some of the units in the above interaction apparatus 200 may be implemented by software, hardware, and a combination thereof. The above units may be embedded in or independent of a processor in a terminal device in the form of hardware, or may be stored in a memory of the terminal device in the form of software, such that the processor can invoke and execute operations corresponding to the above units.

The interaction apparatus 200 may be integrated into a terminal or server that is provided with a memory and has a computing capability with a processor mounted therein, or the interaction apparatus 200 is the terminal or the server.

In some embodiments, the present application further provides a terminal device including a memory and a processor, where the memory stores a computer program, and when the processor executes the computer program, the steps of the above method embodiments are implemented.

As shown in FIG. 13, FIG. 13 is a schematic diagram of a structure of a terminal device according to an embodiment of the present application. The terminal device 300 may be generally provided in the form of glasses, a head-mounted display (HMD), or contact lenses, to implement visual perception and other forms of perception. Certainly, the terminal device is not limited to these implementation forms, and may be further miniaturized or enlarged as needed. The terminal device 300 may include, but is not limited to, the following structures.

A detection module 301: It is configured to detect operation commands from a user by using a variety of sensors, and apply the operation commands to a virtual environment, such as by continuously updating images displayed on a display screen following a line of sight of the user, to enable interaction between the user and a virtual scene, such as by continuously updating content of reality based on a detected turning direction of the head of the user.

A feedback module 302: It is configured to receive data from the sensor, and provide a real-time feedback for the user. The feedback module 302 may be configured to display a graphical user interface, and for example, display the virtual environment in the graphical user interface. For example, the feedback module 302 may include a display screen, etc.

A sensor 303: It is configured to receive the operation commands from the user, and apply the operation commands to the virtual environment. In addition, it is configured to provide results generated after operations to the user in various forms of feedback.

A control module 304: It is configured to control the sensor and various input/output apparatuses, including obtaining of data (such as motions and voice) of the user and outputting of perception data, such as images, vibrations, temperature and sound, to have an effect on the user, the virtual environment, and a physical world.

A modeling module 305: It is configured to construct a three-dimensional model of the virtual environment, which may also include construction of sound, haptics, and various other feedback mechanisms in the three-dimensional model.

In the embodiments of the present application, a virtual scene in a three-dimensional environment may be con-structed by the modeling module 305; a three-dimensional environment generated by a virtual reality device may be displayed by the feedback module 302, and a user interaction interface may be presented by the feedback module 302 in the three-dimensional environment; a gesture of a current object may be recognized by the sensor 303; a visual indication which points to the user interaction interface from the gesture may be generated by the control module 304 based on the user interaction interface and a position of the gesture, and a related interaction operation may be completed in the user interaction interface by the control module 304 based on the gesture and the visual indication, and the visual indication and an interaction operation result may be displayed in the user interaction interface by the feedback module 302.

In some embodiments, as shown in FIG. 14, FIG. 14 is a schematic diagram of another structure of the terminal device according to an embodiment of the present application. The terminal device 300 further includes a processor 310 with one or more processing cores, a memory 320 with one or more computer-readable storage media, and a computer program stored on the memory 320 and executable on the processor. The processor 310 is electrically connected to the memory 320. Those skilled in the art may understand that the structure of the terminal device shown in the figure does not constitute a limitation on the terminal device, and may include more or fewer components than those shown in the figure, or combine some components, or adopt different component arrangements.

The processor 310 is a control center of the terminal device 300, and is connected to various parts of the whole terminal device 300 by using various interfaces and lines. By running or loading a software program and/or module stored in the memory 320, and invoking data stored in the memory 320, various functions of the terminal device 300 and data processing are performed, thereby performing overall monitoring on the terminal device 300.

In the embodiments of the present application, the processor 310 in the terminal device 300 may load instructions corresponding to processes of one or more applications into the memory 320 according to the following steps, and the processor 310 runs the applications stored in the memory 320, to implement various functions:

displaying a three-dimensional environment generated by a virtual reality device; presenting a user interaction interface in the three-dimensional environment; recognizing a gesture of a current object; displaying, based on the user interaction interface and a position of the gesture, a visual indication which points to the user interaction interface from the gesture; and completing a related interaction operation in the user interaction interface based on the gesture and the visual indication.

For the specific implementation of the above operations, reference may be made to the foregoing embodiments, which will not be repeated herein.

In some embodiments, the processor 310 may include a detection module 301, a control module 304, and a modeling module 305.

In some embodiments, as shown in FIG. 14, the terminal device 300 further includes: a radio frequency circuit 306, an audio circuit 307, and a power supply 308. The processor 310 is electrically connected to the memory 320, the feedback module 302, the sensor 303, the radio frequency circuit 306, the audio circuit 307, and the power supply 308, respectively. Those skilled in the art may understand that the structure of the terminal device shown in FIG. 13 or FIG. 14 does not constitute a limitation on the terminal device, and may include more or fewer components than those shown in the figure, or combine some components, or adopt different component arrangements.

The radio frequency circuit 306 may be used to receive and transmit radio frequency signals, to establish a wireless communication with a network device or other terminal devices through wireless communication, thereby receiving and transmitting signals with the network device or the other terminal devices.

The audio circuit 307 may be used to provide an audio interface between the user and the terminal device through a speaker and a microphone. The audio circuit 307 may transmit an electrical signal, which is obtained by converting received audio data, to the speaker, which then converts the electrical signal into a sound signal for output. Moreover, the microphone converts the acquired sound signal into an electrical signal, which is received by the audio circuit 307 and converted into audio data; the audio data is output to the processor 310 for processing, and is then sent to, for example, another terminal device via the radio frequency circuit 306, or is output to the memory for further processing. The audio circuit 307 may further include an earplug jack, to provide a communication between an external headset and the terminal device.

The power supply 308 is used to supply power to the components of the terminal device 300.

Although not shown in FIG. 13 or FIG. 14, the terminal device 300 may further include a camera lens, a wireless fidelity module, a Bluetooth module, an input module, etc., which will not be repeated herein.

In some embodiments, the present application further provides a non-transitory computer-readable storage medium for storing a computer program. The computer-readable storage medium may be applied to a terminal device or a server, and the computer program causes the terminal device or the server to perform the corresponding process in the interaction method in the embodiments of the present application. For brevity, details are not described herein again.

In some embodiments, the present application further provides a computer program product. The computer program product includes a computer program. The computer program is stored in a computer-readable storage medium. A processor of a terminal device reads the computer program from the computer-readable storage medium. The processor executes the computer program so that the terminal device performs the corresponding process in the interaction method in the embodiments of the present application. For brevity, details are not described herein again.

The present application further provides a computer program. The computer program includes a computer program, and the computer program is stored in a computer-readable storage medium. A processor of a terminal device reads the computer program from the computer-readable storage medium. The processor executes the computer program so that the terminal device performs the corresponding process in the interaction method in the embodiments of the present application. For brevity, details are not described herein again.

It should be understood that the processor in the embodiments of the present application may be an integrated circuit chip with a signal processing capability. During implementation, the steps in the above method embodiments may be completed by an integrated logic circuit of hardware in the processor or an instruction in the form of software. The above processor may be a general-purpose processor, a digital signal processor (DSP), an application specific integrated circuit (ASIC), a field programmable gate array (FPGA), or other programmable logic devices, a discrete gate or transistor logic device, or a discrete hardware component. The processor may implement or perform the methods, steps, and logical block diagrams that are disclosed in embodiments of the present application. The general-purpose processor may be a microprocessor, or the processor may be any conventional processor or the like. The steps in the methods disclosed with reference to embodiments of the present application may be directly performed and completed by a hardware decoding processor, or may be performed and completed by a combination of hardware and a software module in the decoding processor. The software module may be located in a mature storage medium in the art, such as a random access memory, a flash memory, a read-only memory, a programmable read-only memory, an electrically erasable programmable memory, or a register. The storage medium is located in a memory. The processor reads information in the memory, and completes the steps in the above method in combination with the hardware of the processor.

It may be understood that the memory in this embodiment of the present application may be a volatile memory or a nonvolatile memory, or may include a volatile memory and a nonvolatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. By way of example but not restrictive description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory for the system and method described herein is intended to include, but is not limited to, these and any other suitable types of memories.

Those of ordinary skill in the art may be aware that the modules and algorithm steps of various examples described in combination with the embodiments disclosed herein can be implemented in electronic hardware or a combination of computer software and electronic hardware. Whether these functions are performed in hardware or software depends on the specific application and design constraint conditions of the technical solution. A person skilled in the art can implement the described functions by using different methods for each particular application, but such implementation should not be considered as going beyond the scope of the present application.

It can be clearly understood by those skilled in the art that, for convenience and brevity of description, for the specific operation processes of the system, apparatus, and units described above, reference may be made to the corresponding processes in the foregoing method embodiments, and details are not described herein again.

In the embodiments of the present application, the term "module" or "unit" refers to a computer program or a part of a computer program with a predetermined function, which operates in conjunction with other related parts to achieve a predetermined objective, and may be implemented by using software, hardware (for example, a processing circuit or a memory), or a combination thereof. Similarly, one processor (or a plurality of processors or memories) may be used to implement one or more modules or units. In addition, each module or unit may be a part of an integrated module or unit including a function of the module or unit.

In the several embodiments provided in the present application, it should be understood that the disclosed system, apparatus, and method may be implemented in other manners. For example, the apparatus embodiment described above is merely an example. For example, the unit division is merely logical function division and may be other division during actual implementation. For example, a plurality of units or components may be combined or integrated into another system, or some features may be omitted or not implemented. In addition, the displayed or discussed mutual couplings, direct couplings, or communication connections may be implemented through some interfaces. The indirect couplings or communication connections between the apparatuses or the units may be implemented in electrical, mechanical, or other forms.

The units described as separate parts may or may not be physically separate, and parts displayed as units may or may not be physical units, and may be located at one position, or may be distributed on a plurality of network units. Some or all of the units may be selected according to actual needs to achieve the objectives of the solutions of the embodiments.

In addition, the various functional units in the embodiments of the present application may be integrated into one processing unit, or the various units may be physically present separately, or two or more units may be integrated into one unit. If the functions are implemented in the form of a software functional unit and sold or used as an independent product, the functions may be stored in a computer-readable storage medium. Based on such an understanding, the technical solutions of the present application essentially, or the part thereof that makes contributions to the related art, or some of the technical solutions may be implemented in the form of a software product. The computer software product is stored in a storage medium, and includes several instructions for instructing a terminal device (which may be a personal computer or a server) to perform all or some of the steps of the methods described in embodiments of the present application. Moreover, the foregoing storage medium includes a USB flash drive, a removable hard disk, a ROM, a RAM, a magnetic disk, an optical disc, or other various media that can store program code.

The foregoing descriptions are merely specific implementations of the present application, but are not intended to limit the scope of protection of the present application. Any variation or replacement readily figured out by a person skilled in the art within the technical scope disclosed in the present application shall fall within the scope of protection of the present application. Therefore, the scope of protection of the present application shall be subject to the scope of protection of the claims.

What is claimed is:

1. An interaction method, comprising:
   displaying a three-dimensional environment generated by a virtual reality device;
   presenting a user interaction interface in the three-dimensional environment;
   recognizing a gesture of a current object;
   displaying, based on the user interaction interface and a position of the gesture, a visual indication which points to the user interaction interface from the gesture; and completing a related interaction operation in the user interaction interface based on the gesture and the visual indication,
   wherein recognizing the gesture of the current object comprises:
      recognizing a finger pinch gesture of the current object, and obtaining pinch point position coordinates of a pinch point of the finger pinch gesture in the three-dimensional environment,
   wherein the visual indication comprises a virtual ray and a virtual cursor,
   wherein displaying, based on the user interaction interface and the position of the gesture, the visual indication which points to the user interaction interface from the gesture comprises:
      obtaining an interface position of the user interaction interface in the three-dimensional environment; and
      generating the virtual ray in the three-dimensional environment based on the interface position, the pinch point position coordinates, and the finger pinch gesture, and generating the virtual cursor at an intersection position of the virtual ray and the user interaction interface, wherein the virtual ray has a ray direction from the pinch point position coordinates toward the interface position, and
   wherein generating the virtual ray in the three-dimensional environment further comprises:
      generating, if the pinch point position coordinates are located at a side of the user interaction interface which is away from eyes of the current object, the virtual ray at the side of the user interaction interface which is away from the eyes of the current object.

2. The interaction method according to claim 1, wherein generating the virtual ray in the three-dimensional environment further comprises:
   generating, if the pinch point position coordinates are located at a side of the user interaction interface which is opposite to the side of the user interaction interface which is away from the eyes of the current object, the virtual ray at an opposite side of the user interaction interface.

3. The interaction method according to claim 1, wherein generating, if the pinch point position coordinates are located at the side of the user interaction interface which is away from the eyes of the current object, the virtual ray at the side of the user interaction interface which is away from the eyes of the current object comprises:
   configuring a first pyramidal spatial structure in the three-dimensional environment, wherein the first pyramidal spatial structure comprises a first origin, a first cross-section, and a second cross-section, the first cross-section is smaller than the second cross-section, the pinch point position coordinates are on the first cross-section, and the interface position is on the second cross-section;
   in response to the finger pinch gesture, generating a ray start point of the virtual ray based on the pinch point position coordinates;
   casting a ray from the first origin to the pinch point position coordinates along the ray direction to intersect with the interface position of the user interaction interface, and determining an intersection position as a ray end point of the virtual ray; and
   generating the virtual ray at the side of the user interaction interface which is away from the eyes of the current object based on the ray start point and the ray end point.

4. The interaction method according to claim 2, wherein generating, if the pinch point position coordinates are located at the side of the user interaction interface which is opposite to the side of the user interaction interface which is away from the eyes of the current object, the virtual ray at the opposite side of the user interaction interface comprises:

configuring a second pyramidal spatial structure in the three-dimensional environment, wherein the second pyramidal spatial structure comprises a second origin, a third cross-section, and a fourth cross-section, the third cross-section is smaller than the fourth cross-section, the pinch point position coordinates are on the third cross-section, and the interface position is on the fourth cross-section;

in response to the finger pinch gesture, generating a ray start point of the virtual ray based on the pinch point position coordinates;

casting a ray from the second origin to the pinch point position coordinates along the ray direction to intersect with the interface position of the user interaction interface, and determining an intersection position as a ray end point of the virtual ray; and generating the virtual ray at the opposite side of the user interaction interface based on the ray start point and the ray end point.

5. The interaction method according to claim 3, wherein generating the ray start point of the virtual ray further comprises:

adjusting a generation position of the ray start point of the virtual ray in real time based on a displacement change of the pinch point position coordinates generated by an associated operation instruction of the finger pinch gesture.

6. The interaction method according to claim 1, wherein the method further comprises:

hiding the virtual ray when a distance between the interface position and the pinch point position coordinates is less than a distance threshold.

7. The interaction method according to claim 1, wherein the virtual cursor comprises any one of the following: a focus indicator cursor, a stereo cursor, an animated cursor, a trail cursor, a color cursor, and a transparent cursor.

8. The interaction method according to claim 1, wherein completing the related interaction operation in the user interaction interface based on the gesture and the visual indication comprises:

performing an interaction operation in the user interaction interface based on an associated operation instruction of the finger pinch gesture and the visual indication, and displaying an interaction operation result in the user interaction interface.

9. The interaction method according to claim 8, wherein the method further comprises:

generating the associated operation instruction based on multi-modal input information, wherein the multi-modal input information comprises at least one of hand movement information, body posture information, eye movement information, voice information, lip movement information, biometric information, and environmental information.

10. The interaction method according to claim 1, wherein the finger pinch gesture comprises one of a one-handed pinch gesture and a two-handed pinch gesture; and generating the virtual ray in the three-dimensional environment based on the interface position, the pinch point position coordinates, and the finger pinch gesture comprises:

if the finger pinch gesture is the one-handed pinch gesture, generating one virtual ray in the three-dimensional environment based on the interface position, the pinch point position coordinates, and the one-handed pinch gesture; or if the finger pinch gesture is the two-handed pinch gesture, generating two virtual rays in the three-dimensional environment based on the interface position, the pinch point position coordinates, and the two-handed pinch gesture.

11. A non-transitory computer-readable storage medium, storing a computer program, wherein the computer program is adapted to be loaded by a processor, to perform following interaction operations:

displaying a three-dimensional environment generated by a virtual reality device;

presenting a user interaction interface in the three-dimensional environment;

recognizing a gesture of a current object;

displaying, based on the user interaction interface and a position of the gesture, a visual indication which points to the user interaction interface from the gesture; and completing a related interaction operation in the user interaction interface based on the gesture and the visual indication, wherein recognizing the gesture of the current object comprises:

recognizing a finger pinch gesture of the current object, and obtaining pinch point position coordinates of a pinch point of the finger pinch gesture in the three-dimensional environment, wherein the visual indication comprises a virtual ray and a virtual cursor, wherein displaying, based on the user interaction interface and the position of the gesture, the visual indication which points to the user interaction interface from the gesture comprises:

obtaining an interface position of the user interaction interface in the three-dimensional environment; and generating the virtual ray in the three-dimensional environment based on the interface position, the pinch point position coordinates, and the finger pinch gesture, and generating the virtual cursor at an intersection position of the virtual ray and the user interaction interface, wherein the virtual ray has a ray direction from the pinch point position coordinates toward the interface position, and wherein generating the virtual ray in the three-dimensional environment further comprises:

generating, if the pinch point position coordinates are located at a side of the user interaction interface which is away from eyes of the current object, the virtual ray at the side of the user interaction interface which is away from the eyes of the current object.

12. The non-transitory computer-readable storage medium according to claim 11, wherein generating the virtual ray in the three-dimensional environment further comprises:

generating, if the pinch point position coordinates are located at a side of the user interaction interface which is opposite to the side of the user interaction interface which is away from the eyes of the current object, the virtual ray at an opposite side of the user interaction interface.

13. The non-transitory computer-readable storage medium according to claim 12, wherein generating, if the pinch point position coordinates are located at the side of the user interaction interface which is opposite to the side of the user interaction interface which is away from the eyes of the current object, the virtual ray at the opposite side of the user interaction interface comprises:

configuring a second pyramidal spatial structure in the three-dimensional environment, wherein the second pyramidal spatial structure comprises a second origin, a third cross-section, and a fourth cross-section, the third cross-section is smaller than the fourth cross-section, the pinch point position coordinates are on the third cross-section, and the interface position is on the fourth cross-section;

in response to the finger pinch gesture, generating a ray start point of the virtual ray based on the pinch point position coordinates;

casting a ray from the second origin to the pinch point position coordinates along the ray direction to intersect with the interface position of the user interaction interface, and determining an intersection position as a ray end point of the virtual ray; and generating the virtual ray at the opposite side of the user interaction interface based on the ray start point and the ray end point.

14. The non-transitory computer-readable storage medium according to claim 11, wherein generating, if the pinch point position coordinates are located at the side of the user interaction interface which is away from the eyes of the current object, the virtual ray at the side of the user interaction interface which is away from the eyes of the current object comprises:

configuring a first pyramidal spatial structure in the three-dimensional environment, wherein the first pyramidal spatial structure comprises a first origin, a first cross-section, and a second cross-section, the first cross-section is smaller than the second cross-section, the pinch point position coordinates are on the first cross-section, and the interface position is on the second cross-section;

in response to the finger pinch gesture, generating a ray start point of the virtual ray based on the pinch point position coordinates;

casting a ray from the first origin to the pinch point position coordinates along the ray direction to intersect with the interface position of the user interaction interface, and determining an intersection position as a ray end point of the virtual ray; and generating the virtual ray at the side of the user interaction interface which is away from the eyes of the current object based on the ray start point and the ray end point.

15. The non-transitory computer-readable storage medium according to claim 14, wherein generating the ray start point of the virtual ray further comprises:

adjusting a generation position of the ray start point of the virtual ray in real time based on a displacement change of the pinch point position coordinates generated by an associated operation instruction of the finger pinch gesture.

16. A terminal device, comprising a processor and a memory, wherein the memory stores a computer program, and the processor is configured to perform the following interaction operations by invoking the computer program stored in memory:

displaying a three-dimensional environment generated by a virtual reality device;

presenting a user interaction interface in the three-dimensional environment;

recognizing a gesture of a current object;

displaying, based on the user interaction interface and a position of the gesture, a visual indication which points to the user interaction interface from the gesture; and completing a related interaction operation in the user interaction interface based on the gesture and the visual indication, wherein recognizing the gesture of the current object comprises:

recognizing a finger pinch gesture of the current object, and obtaining pinch point position coordinates of a pinch point of the finger pinch gesture in the three-dimensional environment, wherein the visual indication comprises a virtual ray and a virtual cursor, wherein displaying, based on the user interaction interface and the position of the gesture, the visual indication which points to the user interaction interface from the gesture comprises:

obtaining an interface position of the user interaction interface in the three-dimensional environment; and generating the virtual ray in the three-dimensional environment based on the interface position, the pinch point position coordinates, and the finger pinch gesture, and generating the virtual cursor at an intersection position of the virtual ray and the user interaction interface, wherein the virtual ray has a ray direction from the pinch point position coordinates toward the interface position, and wherein generating the virtual ray in the three-dimensional environment further comprises:

generating, if the pinch point position coordinates are located at a side of the user interaction interface which is away from eyes of the current object, the virtual ray at the side of the user interaction interface which is away from the eyes of the current object.

17. The terminal device according to claim 16, wherein generating the virtual ray in the three-dimensional environment further comprises:

generating, if the pinch point position coordinates are located at a side of the user interaction interface which is opposite to the side of the user interaction interface which is away from the eyes of the current object, the virtual ray at an opposite side of the user interaction interface.

18. The terminal device according to claim 17, wherein generating, if the pinch point position coordinates are located at the side of the user interaction interface which is opposite to the side of the user interaction interface which is away from the eyes of the current object, the virtual ray at the opposite side of the user interaction interface comprises:

configuring a second pyramidal spatial structure in the three-dimensional environment, wherein the second pyramidal spatial structure comprises a second origin, a third cross-section, and a fourth cross-section, the third cross-section is smaller than the fourth cross-section, the pinch point position coordinates are on the third cross-section, and the interface position is on the fourth cross-section;

in response to the finger pinch gesture, generating a ray start point of the virtual ray based on the pinch point position coordinates;

casting a ray from the second origin to the pinch point position coordinates along the ray direction to intersect with the interface position of the user interaction interface, and determining an intersection position as a ray end point of the virtual ray; and generating the virtual ray at the opposite side of the user interaction interface based on the ray start point and the ray end point.

19. The terminal device according to claim 16, wherein generating, if the pinch point position coordinates are located at the side of the user interaction interface which is away from the eyes of the current object, the virtual ray at the side of the user interaction interface which is away from the eyes of the current object comprises:

configuring a first pyramidal spatial structure in the three-dimensional environment, wherein the first pyramidal spatial structure comprises a first origin, a first cross-section, and a second cross-section, the first cross-section is smaller than the second cross-section, the pinch point position coordinates are on the first cross-section, and the interface position is on the second cross-section;

in response to the finger pinch gesture, generating a ray start point of the virtual ray based on the pinch point position coordinates;

casting a ray from the first origin to the pinch point position coordinates along the ray direction to intersect with the interface position of the user interaction interface, and determining an intersection position as a ray end point of the virtual ray; and generating the virtual ray at the side of the user interaction interface which is away from the eyes of the current object based on the ray start point and the ray end point.

20. The terminal device according to claim 19, wherein generating the ray start point of the virtual ray further comprises:

adjusting a generation position of the ray start point of the virtual ray in real time based on a displacement change of the pinch point position coordinates generated by an associated operation instruction of the finger pinch gesture.

* * * * *